United States Patent [19]

Yoshida

[11] Patent Number: 5,383,183
[45] Date of Patent: Jan. 17, 1995

[54] DATA COMMUNICATION EQUIPMENT

[75] Inventor: Atsushi Yoshida, Tokyo, Japan

[73] Assignee: NEC Corporation, Tokyo, Japan

[21] Appl. No.: 935,833

[22] Filed: Aug. 26, 1992

[30] Foreign Application Priority Data

Aug. 28, 1991 [JP] Japan .................... 3-217566

[51] Int. Cl.$^6$ ............................. H04Q 11/04
[52] U.S. Cl. .................... 370/60.1; 370/58.1
[58] Field of Search ............ 370/60, 58.1, 94.1, 370/60.1; 340/825.79, 826

[56] References Cited

U.S. PATENT DOCUMENTS

| | | | |
|---|---|---|---|
| 4,782,478 | 11/1988 | Day, Jr. et al. | 370/60 |
| 5,014,265 | 5/1991 | Hahne et al. | 370/60 |
| 5,020,052 | 5/1991 | DePrycker et al. | 340/825.03 |
| 5,023,604 | 6/1991 | Takase et al. | 340/825.03 |
| 5,040,176 | 8/1986 | Barzilai et al. | 370/94.1 |
| 5,144,297 | 9/1992 | Ohara | 340/825.79 |
| 5,193,087 | 3/1993 | Lichtesh et al. | 370/58.2 |
| 5,274,627 | 12/1993 | De Santis | 370/58.1 |

Primary Examiner—Stephen Chin
Assistant Examiner—T. Ghebretinsae
Attorney, Agent, or Firm—Whitman, Curtis, Whitman & McGinn

[57] ABSTRACT

Data communication equipment incorporating a matrix switch 11 and a control section 19 in which the matrix switch 11 is provided between M terminal interface units $12_1$–$12_M$ and N communication channel interface units $13_1$–$13_N$ and is capable of switching the combination of the N communication channels $10_1$–$10_N$ and the M data terminal units $18_1$–$18_M$ to enable mutual connections between a desired pair of communication channel and interface units. The controller 19 controls the matrix switch 11 and prescribes the appropriate connections between one of the N communication channel interface units $13_1$–$13_N$ and one of the M terminal interface units $12_1$–$12_M$. Both the N communication channel interface units $13_1$–$13_N$ and the M terminal interface units $12_1$–$12_M$ are capable of inserting or extracting the connections to the matrix switch 11 on a unit-to-unit basis by means of a pair of N terminal groups $15_1$–$15_N$ and M terminal interface units $14_1$–$14_M$, both of which are designed to allow insertion and extraction. Among the terminal interface units to be included herein are the LAN interface units originally designed to be used with a LAN system, a router, a bus and a protocol converter.

4 Claims, 5 Drawing Sheets

DATA COMMUNICATION EQUIPMENT

BACKGROUND OF THE INVENTION

1. Field of the Invention

The present invention relates generally to data communication equipment to be installed at a host computer site, and in particular, with emphasis on an interface connecting equipment to be employed with the associated communication channel and terminal equipment.

2. Description of the Related Art

In conventional data communication equipment intended to accommodate a plurality of communication channels, such units as aggregate MODEMs and aggregate DSUs (Digital Service Units) have been commonly employed. In all of the units exemplified herein, however, MODEM cards or DSU cards to be used with either one of these units have usually consisted of a combination of terminal circuits, each circuit being provided for each individual communication channel or unit of terminal equipment for the purpose of terminating each terminal interface or channel interface, a plurality of these cards being installed in a rack for installation. Incidentally, in the case of a Local Area Network (LAN), terminating circuits provided for the purpose of terminating the communication channel interfaces have sometimes been installed in the LAN router, but terminating circuits provided for the purpose of terminating the terminal interfaces are usually not installed.

Among the kinds of communication channel services considered for inclusion in a communication channel interface are packet services and private digital communication channel services in addition to the conventional private analog communication channel services. There is a very wide range of diverse types of communication channel services provided. Moreover, such novel interfaces as I-series interfaces, LAN interfaces and a variety of other types of interfaces have started to be employed in addition to the conventional V-series and X-series interfaces.

In the case of conventional data communication equipments using aggregate MODEMs or aggregate DSUs, the usual practice is to combine the communication channel and terminal interfaces into one unit and install a plurality of such units in an installation rack. As the result, the combination of the communication channels and the terminals are fixed, and it has therefore been almost impossible to provide different combinations of terminal and communication channel interfaces due to economical considerations. Furthermore, the recent trend in communication equipment, e.g. LAN equipment, has been toward connectionless equipment, and the communication content therefore tends to be full of bursts. Consequently, the use of different combinations of communication channels and terminal interfaces tailored to better meet the needs of each customer and to comply with the amount of traffic becomes all the more important from an economic point of view. Conventional data communication equipment fails to address these needs.

SUMMARY OF THE INVENTION

The object of the present invention is to provide data communication equipment capable of overcoming the difficulties that have been pointed out in the preceding section by providing communication equipment which can economically meet the different requirements of each customer for a wide variety of diversified applications, such equipment being able to select the appropriate channel at the beginning of each communication and also able to back up pertinent communication during periods of heavy communication traffic or channel failure. In order to realize this objective, the data communication equipment of the present invention incorporates N communication channel interface units which are capable of terminating individually each of the N communication channel interfaces, and M data terminal interface units which are capable of terminating each of the M data terminal interfaces. The said data communication equipment is equipped with a matrix switching means capable of selecting each one of the communication channel interface units and each one of the terminal interface units and connect them to each other. Each communication channel interface unit and each data terminal interface unit possesses a means of insertion and extraction by which said pair of interface units can be individually inserted or extracted.

Moreover, at least one of the terminal interface units incorporates (1) L LAN interface units connected to each of the L LANs, (2) a router which prescribes addresses of the packet data, (3) an output packet of the router, (4) a protocol converter which converts protocols of the communication channels connected to the equipment and (5) a bus which connects the L LANs, the router, and the protocol converter. The said terminal interface units can include a means of connecting a particular communication channel interface unit selected from said N communication channel interface units and said protocol converter.

The said matrix switching means selects each one of the units from said N communication channel interface units and M data terminal interface units and connects said pair of units to each other. Furthermore, since both the communication channel interface units and the data terminal interface units are designed to connect or disconnect the matrix switch individually by means of the connecting, inserting and extracting means, the numbers N and M of the communication channels and of the data terminals, respectively, can be individually changed after installation of the equipment or even during operation.

Consequently, the present invention allows the provision of economical equipment which is also best suited to the particular type of operation for each customer. It also allows selection of the most appropriate channel at each start of a particular communication and also allows communication back-up.

The above and other objects, features, and advantages of the present invention will become apparent from the following description referring to the accompanying drawings which illustrate an example of a preferred embodiment of the present invention.

BRIEF DESCRIPTION OF THE DRAWINGS

With reference to the attached drawings, detailed explanations of the practical examples of the present invention are given as follows.

DESCRIPTION OF THE PREFERRED EMBODIMENTS

Figure 1:
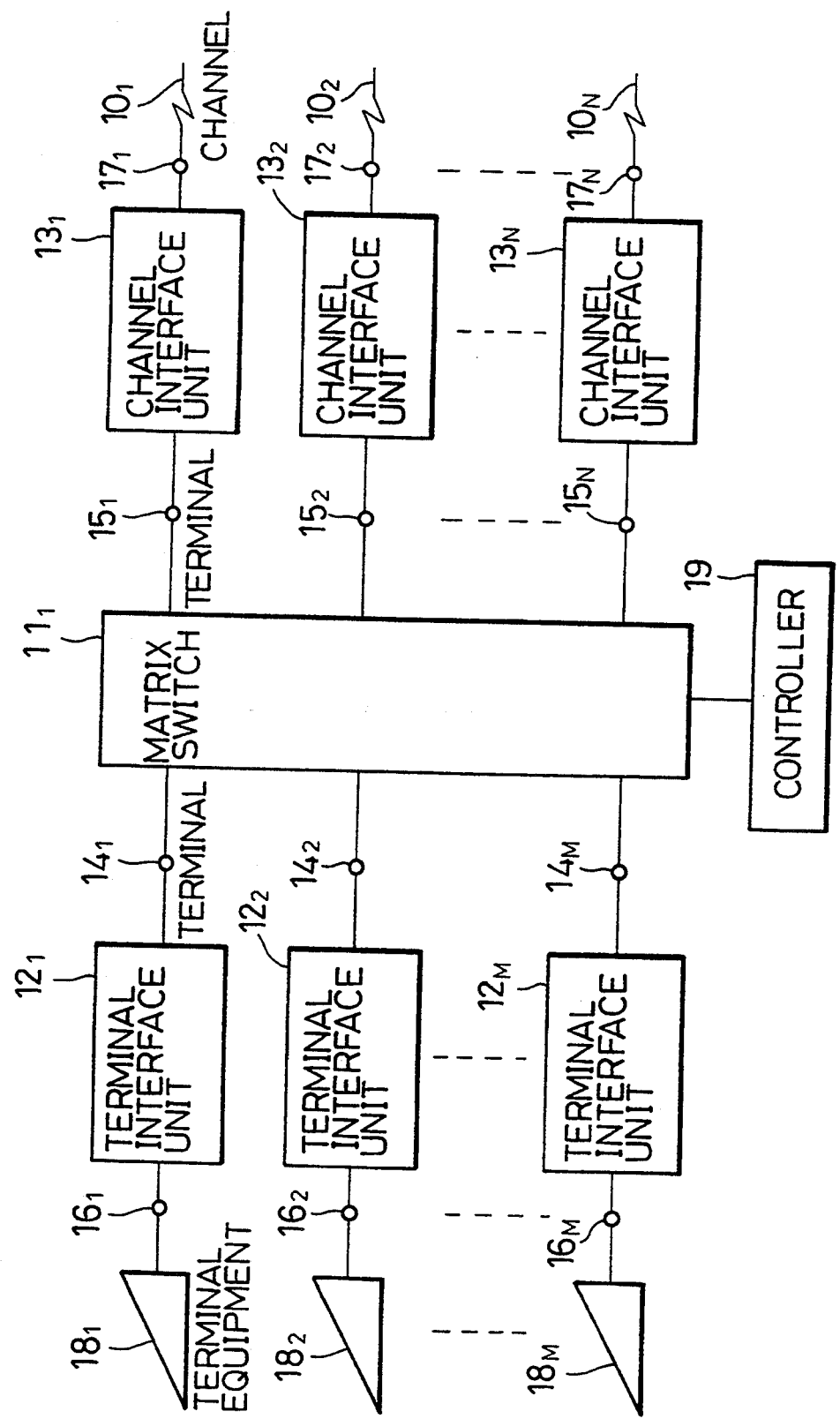
FIG. 1: A block diagram of one of the practical examples of the data communication equipment of the present invention.

A typical practical example of the data communication equipment of the present invention, a block diagram of which is shown in FIG. 1, consists of (1) the N communication channel interface units $13_1-13_N$, (2) the M terminal interface units $12_1-12_M$, (3) the matrix switch 11 and the controller 19, (4) the N terminals $15_1-15_N$ and (5) the M terminals $14_1-14_M$. (1) The N communication channel interface units $13_1-13_N$ are connected with the N communication channels $10_1-10_N$ through the N terminals $17_1-17_N$ enabling termination of the interface for each communication channel. (2) The M terminal interface units $12_1-12_M$ are connected with the M data terminals $18_1-18_M$ through the M terminals $16_1-16_M$ enabling termination of the interface for each data terminal. (3) The matrix switch 11 constitutes a means of matrix switching by selecting one of the N communication channel interface units $13_1-13_N$ and one of the M terminal interface units $12_1-12_M$, the selected pair of units being then connected to each other. The controller 19 serves to control the matrix switch 11. (4) The N terminals $15_1-15_N$, which are capable of insertion and extraction, serve to individually connect one of the N communication channel interface units $13_1-13_N$ with the matrix switch 11, which serves as the first means of insertion and extraction. (5) The M terminals $14_1-14_M$, which are also capable of insertion and extraction, serve to individually connect one of the M terminal interface units $12_1-12_M$ with the matrix switch 11, which serves as the second means of insertion and extraction.

Figure 2:
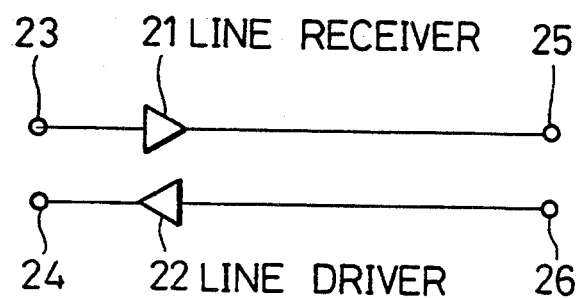
FIG. 2: A block diagram of a practical example of the terminal interface unit 12 shown in FIG. 1.

Each one of the terminal interface units $12_1-12_M$ is in compliance with the CCITT recommendations V24/V28 and, as shown in FIG. 2, converts the voltage by means of the line receiver 21 and the line driver 22. The terminals 23 and 24 are connected with the M data terminals $18_1-18_M$ through the M terminals $16_1-16_M$. The terminals 25 and 26 are connected with the matrix switch 11 through the M terminals $14_1-14_M$.

Figure 3:
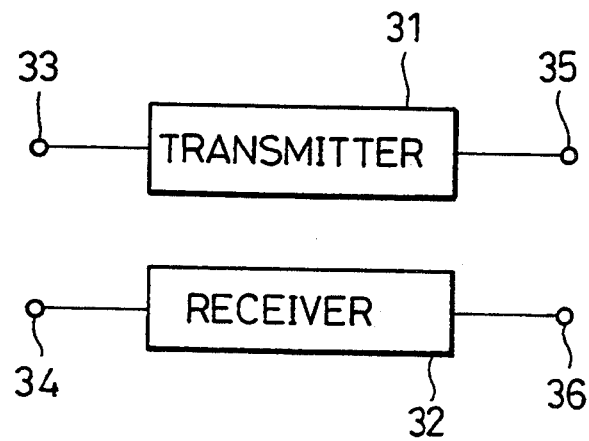
FIG. 3: A block diagram of a practical example of the N communication channel interface units $13_1$–$13_N$ shown in FIG. 1.

Each one of the N communication channel interface units $13_1-13_N$ is designed exclusively to be used for digital private channels. As shown in FIG. 3, these channel interface units $13_1-13_N$ consists of a transmitter 31 and a receiver 32. The transmitter 31 and the receiver 32 are connected with the matrix switch 11 through the N terminals $15_1-15_N$ by means of terminals 33 and 34, respectively, and are connected with the communication channels $10_1-10_N$ through the N terminals $17_1-17_N$ by means of terminals 35 and 36, respectively.

Figure 4:
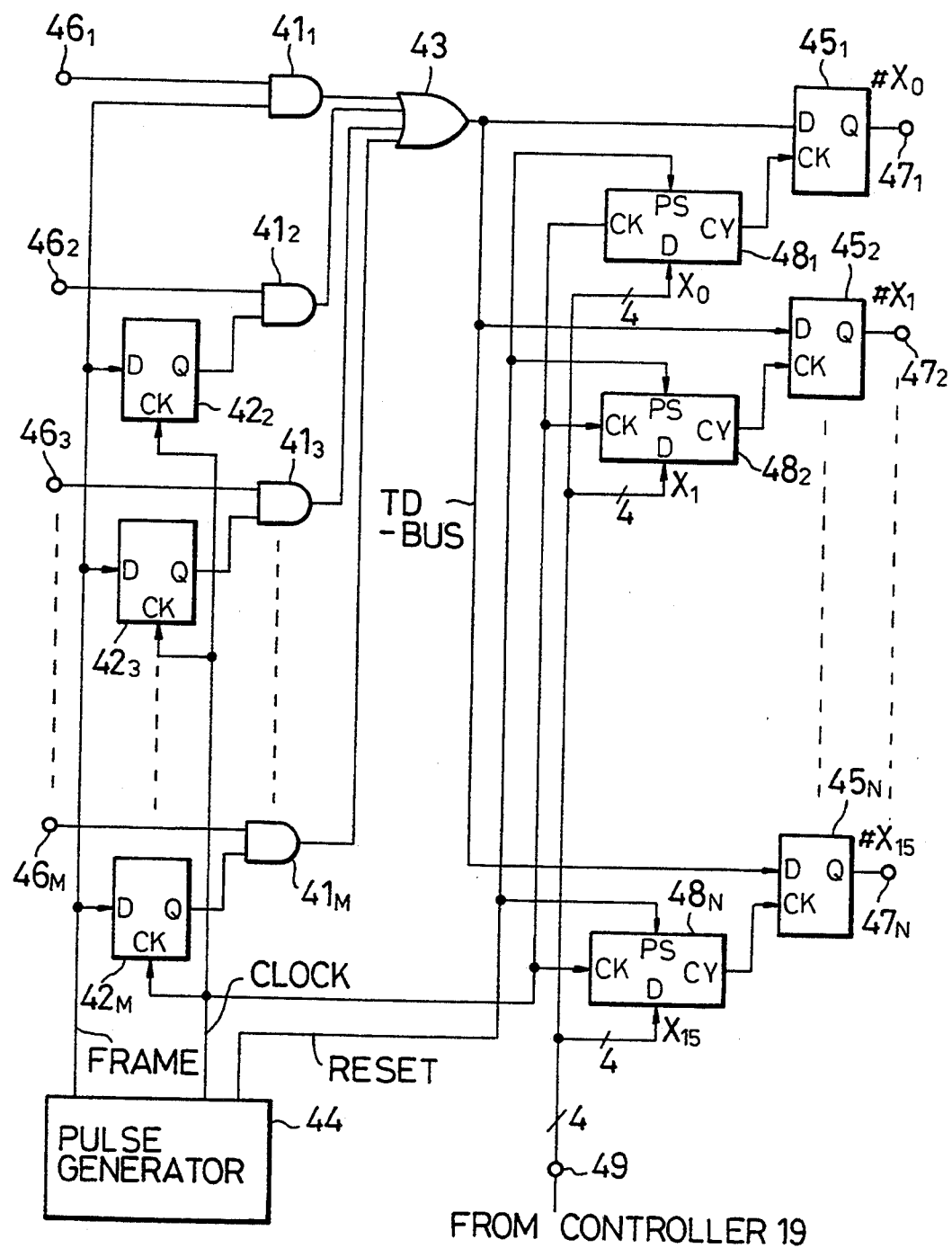
FIG. 4: A block diagram of a practical example of the matrix switch 11 shown in FIG. 1.
Figure 5:
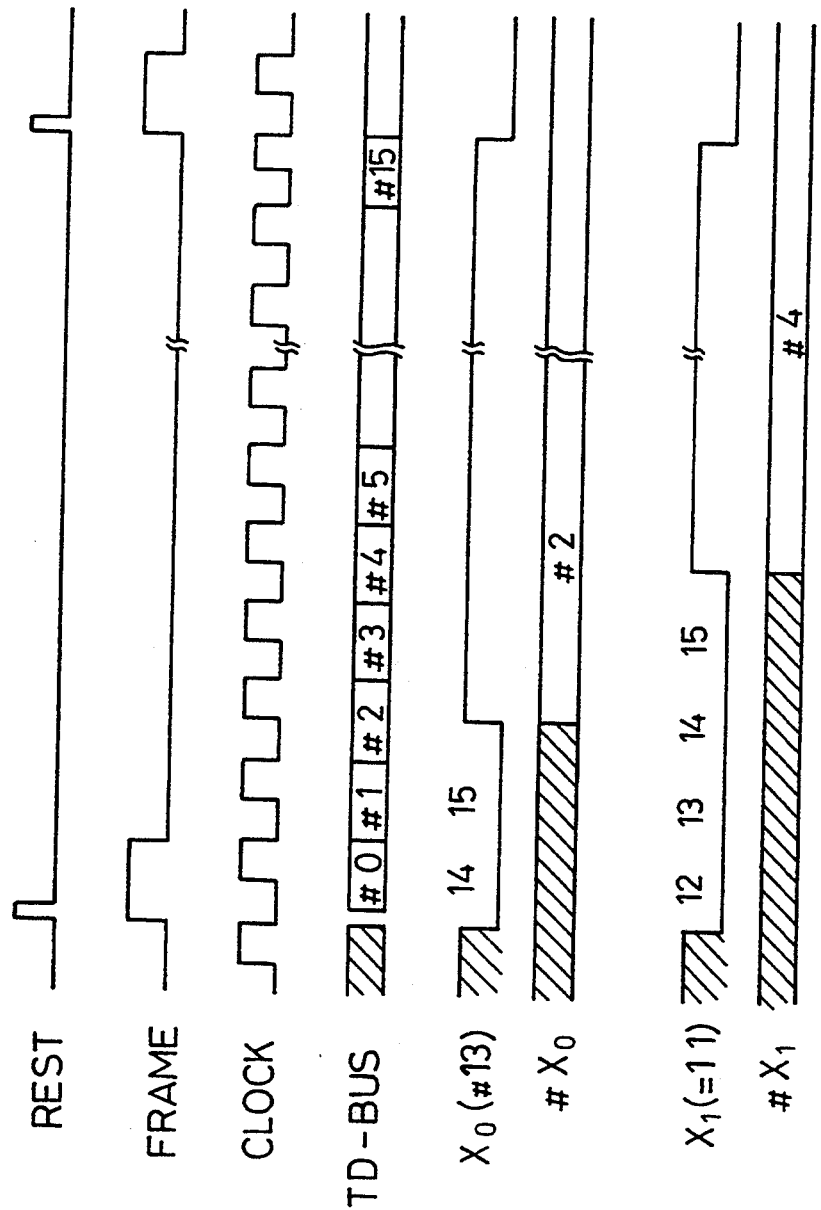
FIG. 5: A timing chart explaining the operation of the matrix switch 11 shown in FIG. 4.

FIGS. 4 and 5 show the block diagram and the timing chart, respectively, of the operation of the matrix switch 11 which operates on time sharing. In the particular case shown, the matrix switch 11 consists of 16 AND gates $41_1-41_{M=16}$ for the data input, 15 shift registers $42_2-42_{M=16}$, one OR gate 43, 16 flip-flops $45_1-45_N$, 16 counters $48_1-48_N$ for the data output and a pulse generator 44 to generate the frame, reset and clock pulses. The matrix switch 11 is supplied by a series of delayed control pulses of the clock as prescribed by the controller 19 as the input.

The input data #0–#15 for the 16 channels is first applied to the AND gates $41_1-41_{M=16}$ through the input terminals $46_1-46_{M=16}$, following which a series of frame pulses, the delay times of which are different in each channel, are generated by the M shift registers $42_2-42_M$, logical AND operations are executed, and the thereby altered input data #0–#15 is finally applied to the OR gate 43 as the output. This output data #0–#15 is multiplexed by time sharing at the OR gate 43. The multiplexed data is sent out as the output to the input terminals Ds of the flip-flops $45_1-45_N$ through the TD BUS. By means of the delayed control pulses sent out from the controller 19, the counters $48_1-48_N$ send out the clock pulse delayed by n counts from the frame pulse in compliance with each channel to the input terminal D as the output. The input data to the input Ds of the flip-flops $45_1-45_N$ is triggered by the input clock pulse and the data of the prescribed channel is available at the set of N output terminals $47_1-47_{N=16}$ as the output.

Figure 6:
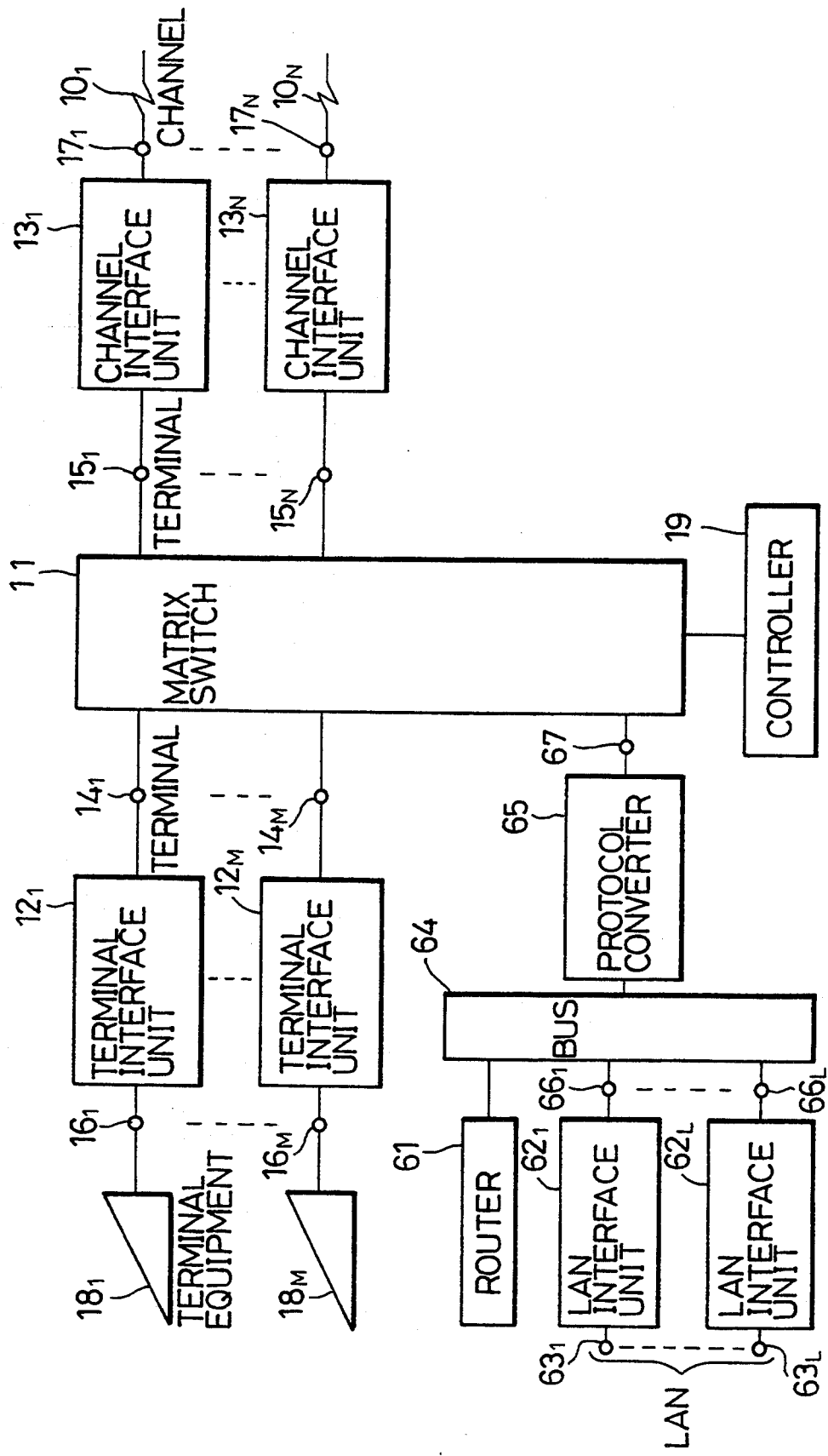
FIG. 6: A block diagram of another practical example of the data communication equipment of the present invention.

In the next section, explanations are given of another practical example of the data communication equipment of the present invention in which one of the data terminals is connected to L LANs. In FIG. 6, the N communication channels $10_1-10_N$, the N communication channel interface units $13_1-13_N$, the M data terminals $18_1-18_M$, the M terminal interface units $12_1-12_M$, the matrix switch 11 and the controller 19 are each identical with the corresponding communication channels and equipment shown in FIG. 1. The system explained in the present practical example consists of a bus 64, LAN interface units $62_1-62_L$, a router 61 which serves to prescribe the addresses of the packets to be sent out to the bus 64, and a protocol converter 65 to be inserted between the bus 64 and the matrix switch 11.

Each LAN is connected with one of the LAN interface units $62_1-62_L$ through the terminals $63_1-63_L$, respectively, and the packet data is sent to the router 61 through the bus 64. The packet data with addresses prescribed by the router 61 are sent to other L LAN interface units 62s or to the protocol converter 65 through the bus 64. The protocol converter 65 converts the input packet data by means of such programs as SLP (Single Link Procedure) or MLP (Multi Link Procedure) and sends it out to the matrix switch 11. When the packet data are transmitted and received between the LANs within the system, the data is sent through the bus 64 but not to the matrix switch 11. Consequently, the overall efficiency of the entire data communication equipment is never adversely affected.

It is to be understood that variations and modifications of the data communication equipment disclosed herein will be evident to those skilled in the art. It is intended that all such modifications and variations be included within the scope of the appended claims.

I claim:

1. Data communication equipment for installation at a host computer site, comprising N communication channel interface units designed to terminate each interface of N communication channels, M terminal interface units designed to terminate each interface of M terminals, matrix switching means installed between the communication channel interface units and the terminal interface units for selecting one of the communication channel interface units and one of the terminal interface units as a pair of interface units to accomplish mutual connection of said pair of selected units, said matrix switching means being connected to said N channel interface units and said M terminal interface units to allow insertion/extraction of channel interface units and terminal interface units, and controller means connected to said matrix switching means for connecting said pair of selected units to each other in a manner capable of individual insertion and extraction of said pair of selected units, wherein said matrix switching means comprises:

M AND gates each having a first input connected to a corresponding one said M terminal interface units, M-1 shift registers each having an output connected to a corresponding one of a second input of second through M AND gates, said shift registers each receiving a frame pulse input and a clock pulse input and generating different time delays, an OR gate connected to receive outputs of said M AND gates and delivering a time shared output, N flip-flops connected to receive the output of said OR gate and triggered by a clock input, N counters each having a reset input and a clock pulse input and generating an output to a corresponding clock input of said N flip-flops, said counters being controlled by said controller means to generate their outputs delayed by n counts from a frame pulse, and pulse generator means for generating frame, reset and clock pulses to said shift registers and said counters.

2. Data communication equipment as described in claim 1, wherein at least one of said terminal interface units includes:

L LAN interface units connected to L local area networks (LANs), router means for prescribing addresses of packet data for each LAN and packet data derived from said router means, protocol converter means for converting protocols between all communication channels connected to said equipment, and a bus connecting said L LANs, said router means and said protocol converter means.

3. Data communications equipment as described in claim 2 wherein said matrix switching means operates on a time sharing basis.

4. Data communication equipment as described in claim 1 wherein said matrix switching means operates on a time sharing basis.

* * * * *